United States Patent [19]

Sugahara

[11] Patent Number: 5,754,699
[45] Date of Patent: May 19, 1998

[54] METHOD OF REDUCING MOSQUITO NOISE GENERATED DURING DECODING PROCESS OF IMAGE DATA AND DEVICE FOR DECODING IMAGE DATA USING THE SAME

[75] Inventor: Takayuki Sugahara, Kanagawa-ken, Japan

[73] Assignee: Victor Company of Japan, Ltd., Yokohama, Japan

[21] Appl. No.: 561,447

[22] Filed: Nov. 21, 1995

[51] Int. Cl.$^6$ .............................. H04N 5/210; H04N 1/40
[52] U.S. Cl. .......................... 382/233; 358/432; 382/232
[58] Field of Search ................................ 358/432–433; 382/232–233, 248, 250–251

[56] References Cited

U.S. PATENT DOCUMENTS

| | | | |
|---|---|---|---|
| 5,241,387 | 8/1993 | Fujikawa et al. | 358/167 |
| 5,434,677 | 7/1995 | Oikawa | 358/335 |
| 5,535,013 | 7/1996 | Murata | 358/432 |

FOREIGN PATENT DOCUMENTS 5-227431  9/1993  Japan .

OTHER PUBLICATIONS

Yasuyuki Nakajima, "Postprocessing Algorithms for Noise Reduction of MPEG Coded Video", Technical Report of IEICE, IE94-7, DSP94-7(1994-04), pp. 45-51, 1994.

Masahiko Achiha et al., "Image Quality Improving Circuit", Broadcasting Technology, 1992.2, pp. 141-147, 1992.

Primary Examiner—Edward L. Coles, Sr.
Assistant Examiner—Stephen Brinich
Attorney, Agent, or Firm—Michael N. Meller

[57] ABSTRACT

A device for decoding coded image data to generate decoded image data by applying inverse orthogonal transformation to each block into which the coded image data is divided includes a quantization-information detecting unit detecting block-quantization-step-size information indicative of quantization step sizes used for a given block, and a frequency-characteristic modifying unit modifying high frequency components of the decoded image data for the given block based on the block-quantization-step-size information, the high frequency components having frequencies higher than a predetermined frequency.

24 Claims, 13 Drawing Sheets

METHOD OF REDUCING MOSQUITO NOISE GENERATED DURING DECODING PROCESS OF IMAGE DATA AND DEVICE FOR DECODING IMAGE DATA USING THE SAME

BACKGROUND OF THE INVENTION

1. Field of the Invention

The present invention generally relates to noise reduction methods and image decoding devices, and particularly relates to a method of reducing a mosquito noise generated during a decoding process of coded image data and to a device for decoding the coded image data based on the method.

2. Description of the Related Art

When transmitting, recording, or reproducing various signals such as video signals, audio signals, etc., as digital signals, techniques for compressing and decompressing information are generally employed to reduce the amount of information, i.e., the number of bits. For example, if a linear quantization (uniform quantization) which represents each sample value with a value selected from evenly divided signal levels is used for digitizing video signals, audio signals, and the like without any compression technique, the amount of information to be transmitted or recorded/reproduced becomes prohibitively large. Thus, in the fields of broadcasting, communication, and information recording/reproducing, characteristics of human visual perception and auditory perception have been utilized in such compression techniques. For example, the human perception is sensitive to changes in signal levels when a signal has a little variation, while it is not so sensitive to the changes when a signal has a strong fluctuation. Such characteristics can be utilized to reduce the amount of information for each sample value. Also, a number of technologies for compressing information have been employed to bring about an advance in the practical use of highly efficient compression techniques.

For example, the amount of information contained in a one-hour moving picture having an image quality similar to those reproduced by VHS-type VTR devices is about 109 Gbits. Also, 360 Gbits, more or less, are contained in such one-hour moving picture with an image quality comparable to reception images of NTSC color-television sets. Thus, an effort to develop highly efficient compression techniques is also directed to application studies aimed at transmitting or recording/reproducing such a large amount of information by means of current transmission lines or recording media.

Highly efficient compression methods which have been proposed as practical methods for image-information application typically combine three different compression techniques to reduce the amount of information. The first technique reduces the amount of information by utilizing correlation within an image frame (compression utilizing spatial correlation), which takes advantage of the fact that there is high correlation between adjacent pixels in natural images. The second technique reduces the amount of information by utilizing correlation between image frames arranged in time (compression utilizing temporal correlation). The third technique reduces the amount of information by utilizing a different probability of appearance of each code. As techniques for compressing image information by utilizing correlation within an image frame (the first technique), a variety of techniques have been proposed. In recent years, orthogonal transformation such as the K-L (Karhunen-Loève) transform, the Discrete Cosine Transform (DCT), the discrete Fourier transform, and the Walsh-Hadamard transform have often been employed.

For example, highly efficient coding methods for image information proposed by the MPEG (moving picture coding expert group) which has been established under the ISO (international standardization organization) employ two-dimensional DCT. These highly efficient coding methods (MPEG1 and MPEG2) combine intra-frame coding and inter-frame coding to realize highly efficient coding of moving-picture information while employing motion compensation prediction and inter-frame prediction. The orthogonal transformation is generally applied to blocks which are generated by dividing an image into unit blocks having a predetermined block size (M×N). In MPEG1 and MPEG2, a block having an 8-pixel-by-8-pixel block size is defined as a unit block.

M×N orthogonal transform coefficients which are obtained by orthogonally transforming the unit block (e.g., 64 DCT transform coefficients in MPEG1 and MPEG2) are then quantized by using block-quantization step sizes (intervals for quantization). The block-quantization step sizes are defined for each predetermined-size area including at least one unit block. In MPEG1 and MPEG2, for example, this predetermined-size area is called a macro block, which consists of a block of 16×16 pixels for a luminance signal Y and a block of 8×8 pixels for each of color signals Cr and Cb. In detail, the block-quantization step sizes are represented as [{a quantization characteristic of a macro block (a quantization scale of a macro block) QS}×quantization matrix (8×8)]. Here, the quantization characteristic of a macro block changes from macro block to macro block.

The orthogonal transform coefficients (e.g., DCT coefficients) which are quantized based on the block-quantization step sizes are separated into a direct current component (DC component) and alternating current components (AC components). The direct current component of the orthogonal transform coefficients is subjected to differential coding, and the alternating current components of the orthogonal transform coefficients are subjected to entropy coding after a zigzag scan. Here, the entropy coding is an information compression technique using a variable-length coding scheme which utilizes a different probability of appearance of each code such as in the Huffman coding. Transformed and coded image data is transmitted as a bit stream (a series of bits). A decoding operation on the transformed and coded image data is carried out in a reversed manner to the coding operation described above so as to generate an output image. However, when the quantization process is included in the entire coding process, unavoidable quantization errors result in quantization noise appearing in the output image. Thus, when the complexity of an image subjected to the coding process contains a larger amount of information than the capacity of a transmission rate, the quantization noise will substantially degrade an image quality.

In general, the quantization errors in low-frequency components result in block distortions in the output image, by which there appears to be no correlation between each block of the output image. Also, the quantization errors in high-frequency components generate mosquito noise around edges, which is a distortion having a ringing appearance in the output image.

The quantization errors appearing in the output image are especially conspicuous where image levels are generally flat. When a small amount of quantization noise is added to a point where a change in a video signal level has frequency components from low frequencies to high frequencies, the noise is difficult to be visually detected because of characteristics of visual perception. However, when a small amount of noise having high frequency components is added to a point where a change in the video signal has only low frequency components, the noise is easy to detect. Of course, when a large amount of noise is added, the noise is detected as coding degradation irrespective of the frequency components of the noise.

As a measure to counter the quantization noise, there is a well-known technique called a coring technique. This technique assumes that portions of the decoded image having small high frequency components are mostly comprised of image-signal noise and the quantization noise, and that the portions of the image having a signal level lower than a predetermined level should have a zero signal level. This coring technique has been used as a method of removing small noises appearing in analog signals (a reference can be found in, for example, Broadcast Technology, pp.141–147, February, 1991).

In general, the block-quantization step sizes have larger values for high frequency components than for low frequency components, reflecting the characteristics of visual perception. Thus, the quantization error tends to appear in the high frequency components. In consideration of this, the coring technique described above may be applied only to high frequency components to convert signal levels lower than a predetermined level (coring level) into a zero level. Then, the signal processed by the coring technique is added to a signal of the low frequency components. However, when the coring level is set in accordance with a magnitude of the quantization noise generated by large quantization step sizes, an output image tends to have a flat-like appearance without fine textures. On the other hand, if the coring level corresponding to a magnitude of the quantization noise generated by small quantization step sizes is used, the quantization noise having a large magnitude cannot be removed. In other words, since the coring level is fixed to a predetermined level, the quantization noise cannot be effectively reduced.

Accordingly, there is a need for a method which can effectively reduce the mosquito noise generated during a decoding process of coded image data, and for a device for decoding the coded image data based on this method.

SUMMARY OF THE INVENTION

Accordingly, it is a general object of the present invention to provide a method and a device which can satisfy the need described above.

It is another and more specific object of the present invention to provide a method which can effectively reduce the mosquito noise generated during a decoding process of coded image data, and a device for decoding the coded image data based on this method.

In order to achieve the above objects according to the present invention, a device for decoding coded image data to generate decoded image data by applying an inverse orthogonal transformation to each block into which the coded image data is divided includes a quantization-information detecting unit detecting block-quantization-step-size information indicative of quantization step sizes used for a given block, and a frequency-characteristic modifying unit modifying high frequency components of the decoded image data for the given block based on the block-quantization-step-size information, the high frequency components having frequencies higher than a predetermined frequency.

The same objects are also achieved according to a present invention by a method of decoding coded image data to generate decoded image data by applying an inverse orthogonal transformation to each block into which the coded image data is divided. The method includes the steps of detecting block-quantization-step-size information indicative of quantization step sizes used for a given block, and modifying high frequency components of the decoded image data for the given block based on the block-quantization-step-size information, the high frequency components having frequencies higher than a predetermined frequency.

In the device and the method described above, the block-quantization-step-size information indicative of the quantization step sizes used for a given block is obtained, and is used for modifying the high frequency components of the decoded image data. That is, the mosquito noise having a magnitude dependent on the quantization step sizes can be reduced by modifying the high frequency components in accordance with the quantization step sizes. Thus, the mosquito noise is effectively reduced without having an adverse effect on necessary fine features of a picture of the decoded image data.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to accompanying drawings.

Figure 1:
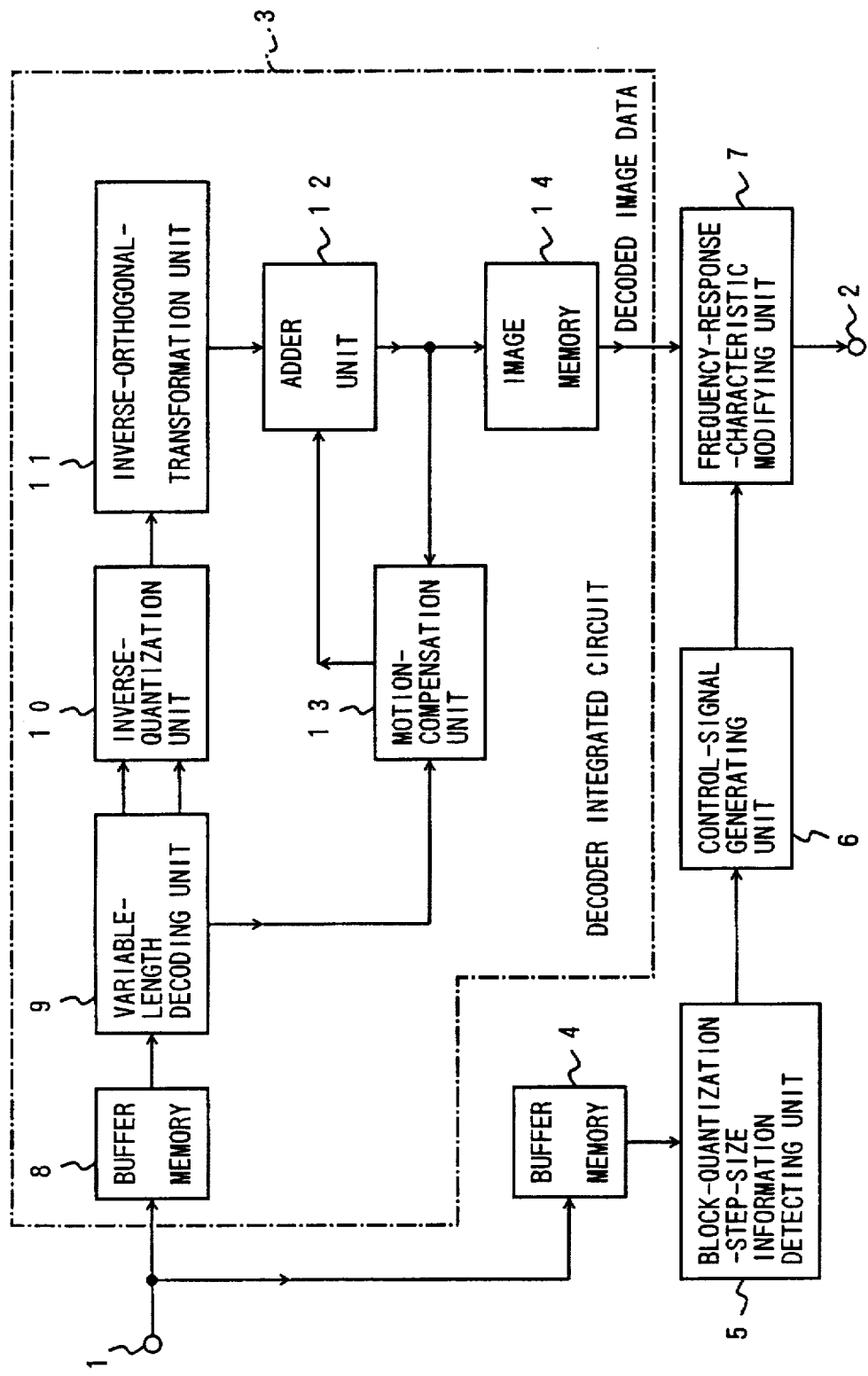
FIG. 1 is a block diagram of an image-data decoding device according to a first embodiment of the present invention.

FIG. 1 is a block diagram of an image-data decoding device according to a first embodiment of the present invention. In FIG. 1, an input node which receives a bit stream (a series of bits) to be decoded is designated by reference number 1. Also, a portion enclosed by a dashed line 3 is provided on an integrated circuit. The portion enclosed by the dashed line 3 includes a buffer memory 8, a variable-length decoding unit 9, an inverse-quantization unit 10, an inverse-orthogonal-transformation unit 11, an adder unit 12, a motion-compensation unit 13, and an image memory 14. An integrated circuit for this portion is commercially available.

The bit stream provided to the input node 1 is image data which is encoded through a highly efficient coding method such as the MPEG1 or the MPEG2 using a combination of the three different compression techniques previously described, i.e., compression by using an orthogonal transformation utilizing correlation within an image frame (compression utilizing spatial correlation), compression by utilizing correlation between image frames arranged in time (compression utilizing temporal correlation), and compression by utilizing a different probability of appearance of each code. In a description provided below, it is assumed that the image data to be decoded is that generated by the MPEG1 or the MPEG2.

The highly efficient coding of moving picture information through the MPEG1 or the MPEG2 uses a combination of intra-frame coding through the two-dimensional Discreet Cosine Transform (two-dimensional DCT) and inter-frame coding, and, also, employs the motion-compensation prediction and the inter-frame prediction. An image signal of each image subjected to the highly efficient coding is divided into a unit block having an 8-pixel-by-8-pixel block size (8 pixels in a horizontal direction and 8 lines in a vertical direction) with the DCT applied to each unit block. Then, the sixty-four DCT transform coefficients obtained for each unit block are quantized by using the block-quantization step sizes. In the MPEG1 and the MPEG2, the block-quantization threshold values are defined for each macro block, which is a predetermined-size area including at least one unit block and consists of a block of 16×16 pixels for the luminance signal Y and a block of 8×8 pixels for each of the color signals Cr and Cb. In detail, the block-quantization step sizes are represented as [{the quantization characteristic of a macro block (the quantization scale of a macro block) QS}×quantization matrix (8×8)]. Here, the quantization characteristic of a macro block (the quantization scale of a macro block) QS is a scale factor which changes from macro block to macro block.

DCT coefficients which are obtained through the quantization process dividing the DCT transform coefficients by the block-quantization step sizes are then separated into the direct current component (DC component) and the alternating current components (AC components). The direct current component of the DCT coefficients is subjected to differential coding, and the alternating current components of the DCT coefficients are subjected to entropy coding (variable-length coding scheme utilizing a different probability of appearance of each code such as in the Huffman coding) after a zigzag scan. Then, a bit stream is generated in which information necessary for the decoding process is attached to the transformed and coded image data. Here, the information necessary for the decoding process includes information regarding the block-quantization step sizes (e.g. the quantization scale of a macro block QS) and information regarding motion vectors and prediction modes, etc. In the image-data decoding device of FIG. 1, the bit stream supplied to the input node 1 is stored in the buffer memory 8, which is made up from a First-In-First-Out (FIFO) memory.

The variable-length decoding unit 9 receives the bit stream read from the buffer memory 8, and decodes the image data coded through the entropy coding (variable-length coding) and the attached information which is necessary for decoding the transformed and coded image data. (Such information includes block-quantization-step-size information (the quantization characteristic of a macro block QS) and information regarding motion vectors and prediction modes, etc.) Then, the image data and the block-quantization-step-size information (the quantization scale of a macro block QS) decoded by the variable-length decoding unit 9 is supplied to the inverse-quantization unit 10. Also, the information regarding motion vectors, prediction modes, etc., is provided to the motion-compensation unit 13.

The inverse-quantization unit 10 which receives the image data and the block-quantization-step-size information (QS) obtains the DCT transform coefficients through an inverse-quantization operation, and provides the coefficients to the inverse-orthogonal-transformation (inverse-DCT) unit 11. The inverse-orthogonal-transformation (inverse-DCT) unit 11 applies the two-dimensional inverse DCT to each unit block to convert the image data in the frequency domain to the image data in the time domain. Resulting image data in the time domain is supplied to the adder unit 12. At the adder unit 12, the image data in the time domain may be added to motion-compensated image data obtained by the motion-compensation unit 13, depending on the coding type indicating either one of the intra-frame coding and the inter-frame coding. Output image data from the adder unit 12 is stored in the image memory 14.

In the image-data decoding device of FIG. 1, the image data provided from the image memory 14 is output at an output node 2 via a frequency-response-characteristic modifying unit 7. The frequency-response-characteristic modifying unit 7 is a coring circuit for carrying out the coring process.

Figure 2:
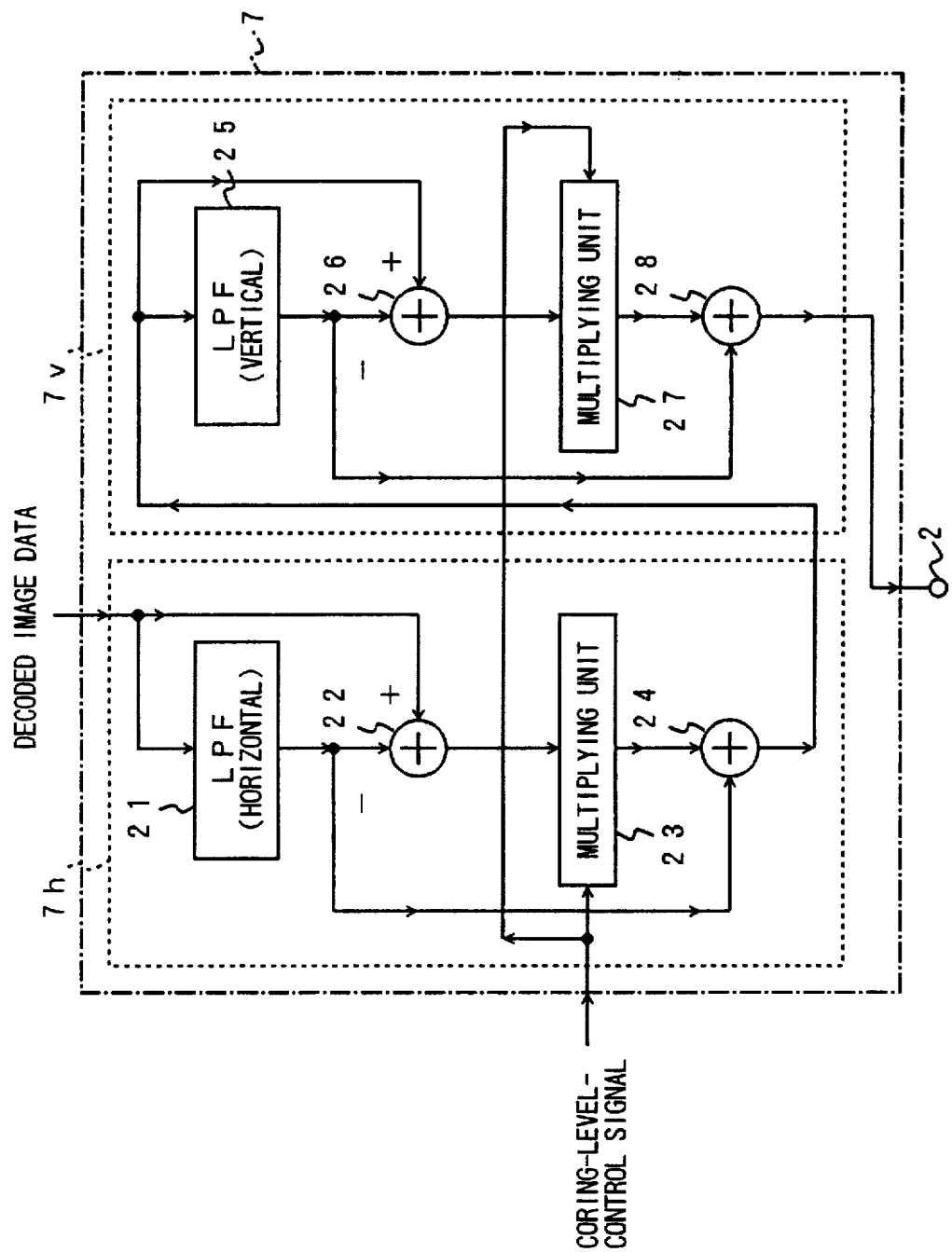
FIG. 2 is a block diagram of a frequency-response-characteristic modifying unit of FIG. 1.
Figure 3:
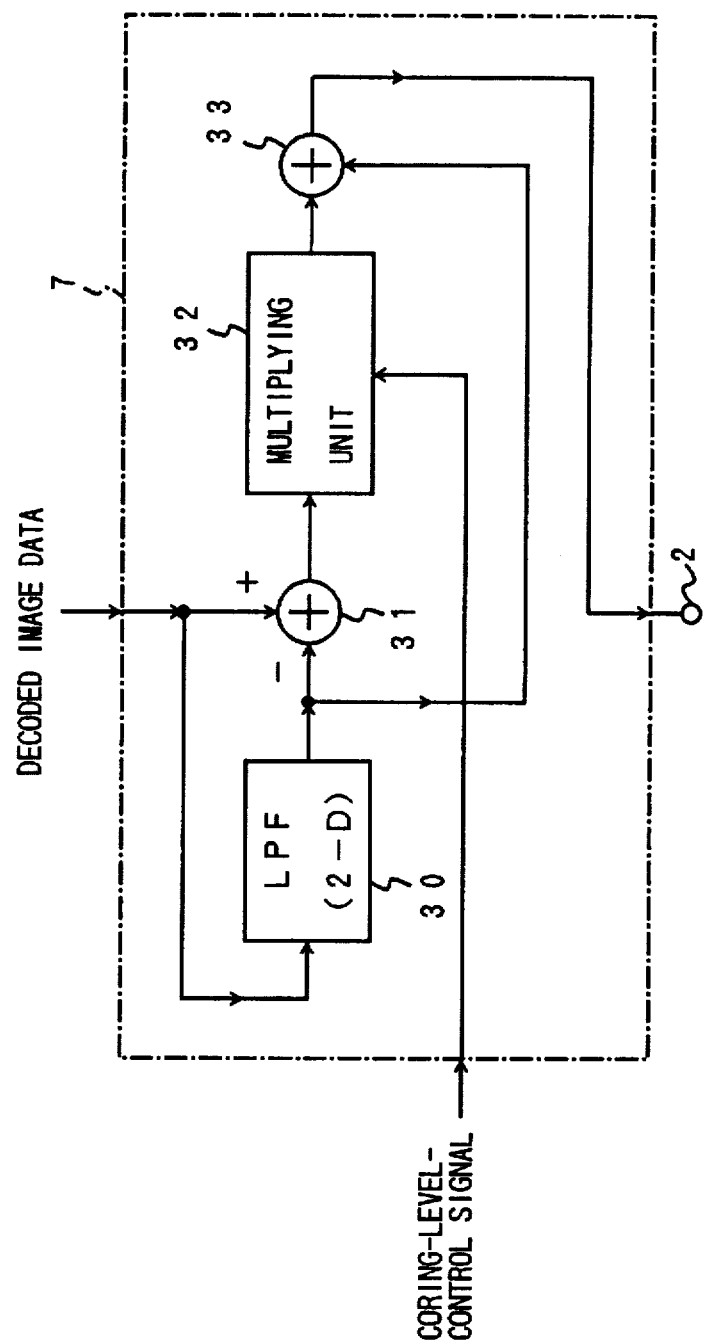
FIG. 3 is a block diagram of another example of the frequency-response-characteristic modifying unit.

The frequency-response-characteristic modifying unit 7 is controlled by a coring-level-control signal provided from a control-signal generating unit 6 so as to change a coring level applied to the image data. FIG. 2 is a block diagram of the frequency-response-characteristic modifying unit 7. FIG. 3 is a block diagram of another example of the frequency-response-characteristic modifying unit 7. Either one of the frequency-response-characteristic modifying units 7 shown in FIG. 2 and FIG. 3 can be used in the image-data decoding unit of FIG. 1.

In FIG. 2, the portion enclosed in a dotted line 7h serves as a coring circuit for applying the coring process in a horizontal direction of the image. Also, the portion enclosed in a dotted line 7v serves as a coring circuit for applying the coring process in a vertical direction of the image. The portion enclosed in the dotted line 7h serving as a coring circuit for the horizontal direction and the portion enclosed in the dotted line 7v serving as a coring circuit for the vertical direction are connected in series. Thus, both portions form a coring circuit for applying a two-dimensional coring process.

In FIG. 2, the portion enclosed by the dotted line 7h includes a horizontal LPF 21 having a predetermined cut-off frequency, a subtracting unit 22, a multiplying unit 23, and an adder unit 24. Also, the portion enclosed by the dotted line 7v includes a vertical LPF 25 having a predetermined cut-off frequency, a subtracting unit 26, a multiplying unit 27, and an adder unit 28.

In FIG. 3, the frequency-response-characteristic modifying unit 7 includes a two-dimensional LPF 30, a subtracting unit 31, a multiplying unit 32, and an adder unit 33, and serves as a coring circuit for applying the two-dimensional coring process. When a filter is applied in two dimensions, a computation amount for adding and multiplying operations is increased. However, there is an advantage in that a frequency band extending in a diagonal direction can be dealt with.

In FIG. 2, the multiplying unit 23 in the portion enclosed in the dotted line 7h and the multiplying unit 27 in the portion enclosed in the dotted line 7v are provided with the coring-level-control signal from the control-signal generating unit 6. In FIG. 3, the multiplying unit 32 is provided with the coring-level-control signal from the control-signal generating unit 6.

In the multiplying units of the frequency-response-characteristic modifying unit 7, signal components in a frequency band higher than the predetermined cut-off frequency of the LPF is multiplied by zero when a magnitude of the signal components is lower than the coring-level-control signal (coring-level-coefficient signal). Thus, the coring process is carried out to reduce undesirable signal components in the higher frequency band.

Figure 4:
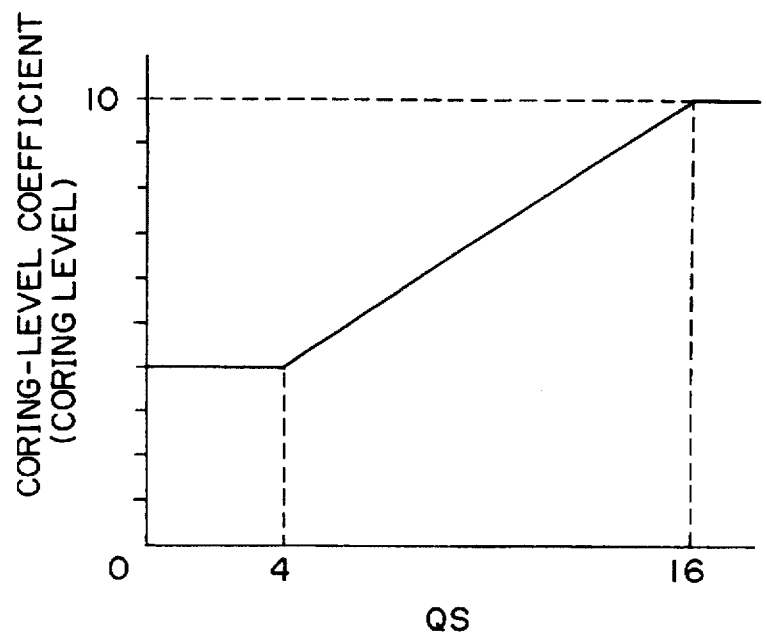
FIG. 4 is a chart of an example of a characteristic curve showing a relation between coring-level coefficients and a quantization scale factor.

FIG. 4 is a chart of an example of a characteristic curve showing a relation between coring-level coefficients and the block-quantization-step-size information (QS).

The coring-level coefficients shown in the ordinate axis of FIG. 4 range from 0 to 10, and are used by the frequency-response-characteristic modifying unit 7 for carrying out signal processing to suppress high-frequency components according to the block-quantization-step-size information (e.g., the quantization scale of a macro block QS). Here, the block-quantization-step-size information is defined for each macro block, i.e., for each predetermined-size area including at least one unit block (DCT block) for which the DCT is applied. In the example of FIG. 4, the coring-level coefficient increases as a value of the block-quantization-step-size information becomes large, and saturates at a certain level.

The control-signal generating unit 6 used in the image-data decoding device of FIG. 1 may include a look-up table (ROM table) for which the block-quantization-step-size information (e.g., the quantization scale of a macro block QS) defined for each macro block is provided as an address. The look-up table (ROM table) outputs a coring-level-coefficient signal (coring-level-control signal) corresponding to a coring-level coefficient according to the address provided thereto.

The frequency-response-characteristic modifying unit 7 which carries out the coring process according to the coring-level-control signal provided from the control-signal generating unit 6 uses a large coring level in an image area where large block-quantization step sizes are used. Thus, the mosquito noise can be easily reduced while maintaining sharp edges. That is, it is possible to take advantage of the characteristics that image areas using large quantization step sizes tend to generate a large magnitude of the mosquito noise and image areas using small quantization step sizes tend to develop a small magnitude of the mosquito noise. Thus, the frequency-response-characteristic modifying unit 7 carries out an adaptive coring process by which a coring level becomes large in image areas using large block-quantization step sizes. As a result, necessary fine features in a picture are prevented from disappearing through the mosquito-noise removal process.

In the image-data decoding device of FIG. 1 employing the adaptive coring process of the present invention, the bit stream (a series of bits) provided to the input node 1 are decoded into the decoded image data by the buffer memory 8, the variable-length decoding unit 9, the inverse-quantization unit 10, the inverse-orthogonal-transformation unit 11, the adder unit 12, and the motion-compensation unit 13 as described above. The decoded image data is stored in the image memory 14, and, then, output therefrom.

The image data read from the image memory 14 is provided to the frequency-response-characteristic modifying unit 7, where the quantization noise is reduced by the adaptive coring process. Thus, the image data with the suppressed quantization noise is output at the output node 2 of the image-data decoding device, which is provided with an adaptive coring device employing the adaptive coring process.

In the image-data decoding device of FIG. 1 equipped with the adaptive coring device, the bit stream which is provided to the input node 1 is stored in the buffer memory 8 of the decoder integrated circuit enclosed by the dashed line 3, and, also, is supplied to a buffer memory 4. The bit stream read from the buffer memory 4 of a First-In-First-Out memory is supplied to a quantization-information detecting unit 5. For the quantization-information detecting unit 5, a mechanism similar to that of the variable-length decoding unit 9 may be used.

The quantization-information detecting unit 5 detects the block-quantization-step-size information (the quantization scale of a macro block QS), and provides it for the control-signal generating unit 6.

Namely, in the image-data decoding device of FIG. 1, the bit stream provided to the input node 1 is supplied via the buffer memory 4 to the quantization-information detecting unit 5, in which the block-quantization-step-size information is detected from the bit stream for a series of the macro blocks to be provided to the control-signal generating unit 6. Here, the buffer memory 4, the quantization-information detecting unit 5, the control-signal generating unit 6, and the frequency-response-characteristic modifying unit 7 are provided outside the decoder integrated circuit enclosed in the dashed line 3. Instead, these units can be included in the same integrated circuit.

Figure 5:
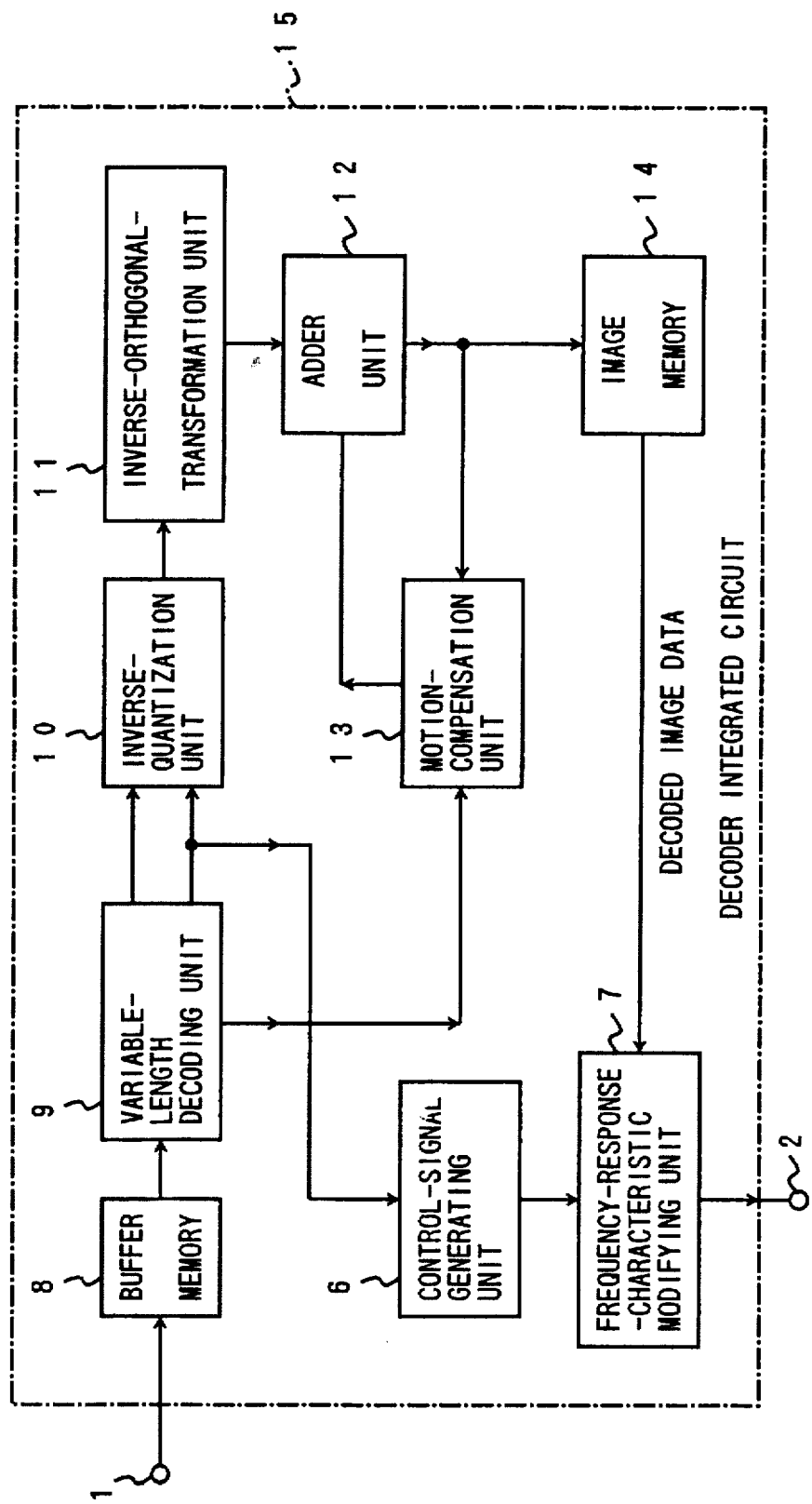
FIG. 5 is a block diagram of an image-data decoding device according to a second embodiment of the present invention.

FIG. 5 is a block diagram of an image-data decoding device according to a second embodiment of the present invention. In FIG. 5, the same elements as those of FIG. 1 are referred to by the same numerals, and a description thereof will be omitted.

In the image-data decoding device of FIG. 5 equipped with the adaptive coring device, all units are provided in a decoder integrated circuit enclosed by a dashed line 15. Also, block-quantization-step-size information which is detected from the bit stream for a series of the macro blocks by the variable-length decoding unit 9 is provided to the control-signal generating unit 6.

Namely, in the image-data decoding device of FIG. 5 equipped with the adaptive coring device, the operations of the buffer memory 4 and the quantization-information detecting unit 5 of FIG. 1 provided outside the decoder integrated circuit indicated by the dashed line 3 are carried out by the buffer memory 8 and the variable-length decoding unit 9 provided in the decoder integrated circuit enclosed in the dashed line 15. Also, in FIG. 5, the decoder integrated circuit enclosed in the dashed line 15 includes the control-signal generating unit 6 and the frequency-response-characteristic modifying unit 7. Here, the control-signal generating unit 6 is provided with the block-quantization-step-size information (e.g., the quantization scale of a macro block QS) extracted from the bit stream for a series of the macro blocks by the variable-length decoding unit 9. Then, the frequency-response-characteristic modifying unit 7 suppresses the high-frequency components of the image data provided from the image memory 14 based on the coring-level-control signal supplied from the control-signal generating unit 6.

As described above, in the first and second embodiments of the present invention, the coring-level-control signal which is generated by the control-signal generating unit 6 is provided to the frequency-response-characteristic modifying unit 7. The coring-level-control signal is related as shown in FIG. 4 to the block-quantization-step-size information of each macro block contained in the bit stream as the attached information. Then, the frequency-response-characteristic modifying unit 7 suppresses the high-frequency components having a level lower than the coring level which is determined according to the block-quantization-step-size information.

Figure 6:
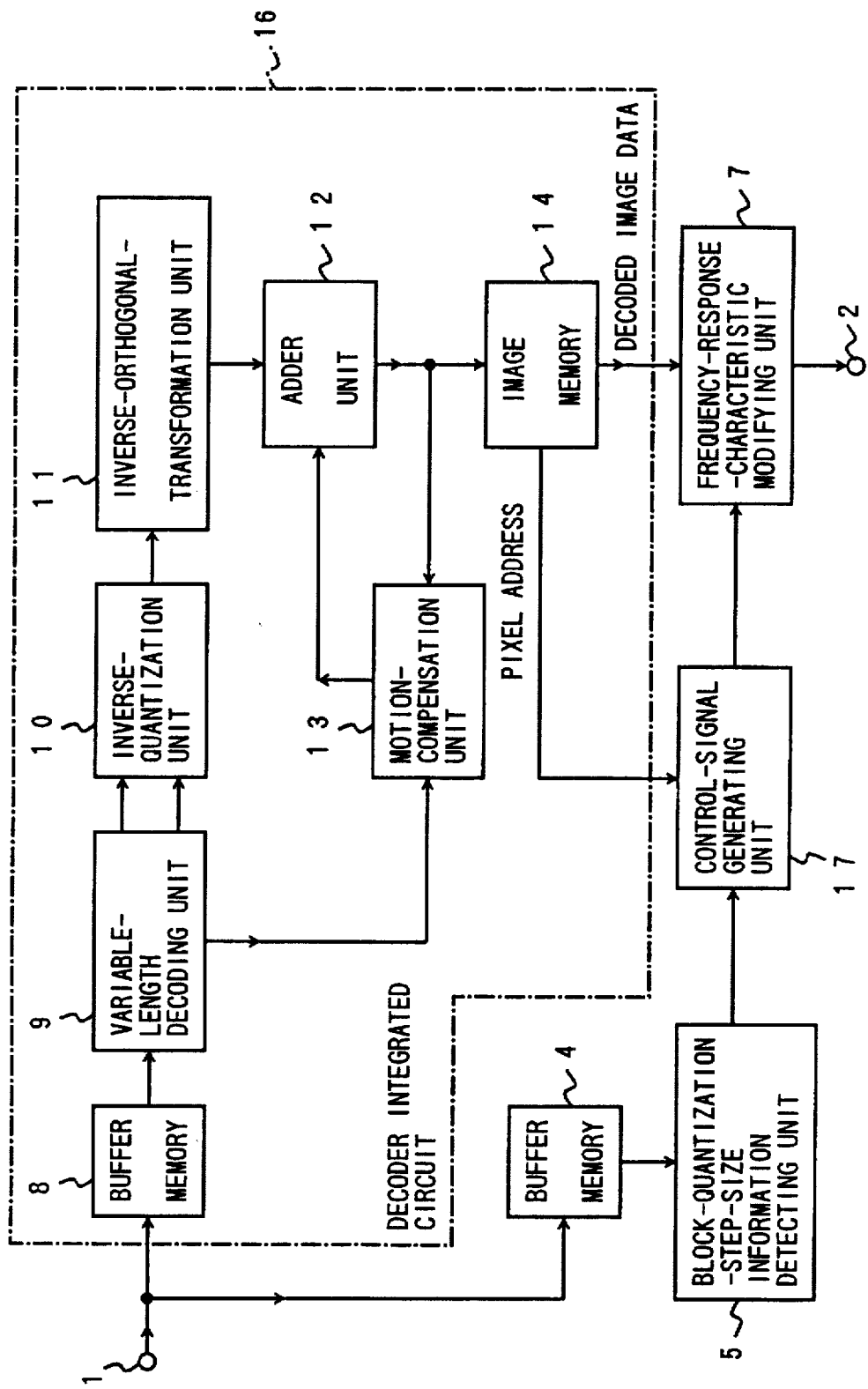
FIG. 6 is a block diagram of an image-data decoding device according to a third embodiment of the present invention.

FIG. 6 is a block diagram of an image-data decoding device according to a third embodiment of the present invention. In FIG. 6, the same elements as those of FIG. 1 are referred to by the same numerals, and a description thereof will be omitted.

In the image-data decoding device of FIG. 6 equipped with the adaptive coring device of the present invention, the bit stream which is to be decoded is applied to the input node 1 to be supplied to the buffer memory 8 of a decoder integrated circuit enclosed in a dashed line 16. Also, the bit stream applied to the input node 1 is provided to the buffer memory 4. The bit stream read from the buffer memory 4 of a First-In-First-Out memory is supplied to the quantization-information detecting unit 5. For the quantization-information detecting unit 5, a mechanism similar to that of the variable-length decoding unit 9 may be used. The quantization-information detecting unit 5 detects necessary information from the bit stream for each macro block, and provides it to a control-signal generating unit 17.

The control-signal generating unit 17 used in the image-data decoding device of FIG. 6 may include a look-up table (ROM table). The look-up table receives as an address thereof the block-quantization-step-size information defined for each macro block from the quantization-information detecting unit 5 and a position of a currently processed pixel from the image memory 14. Here, as described before, the macro block includes at least one unit block to which the DCT is applied. In the control-signal generating unit 17, then, the look-up table (ROM table) outputs a coring-level-coefficient signal (coring-level-control signal) corresponding to a coring-level coefficient according to the address provided thereto (the block-quantization-step-size information and the position of the currently processed pixel).

The reason why the position of the currently processed pixel is provided to the control-signal generating unit 17 along with the block-quantization-step-size information is that an increase in the coring level near borders of unit blocks can effectively reduce the block distortions. That is, not only is the mosquito noise effectively reduced by changing the coring level according to the block-quantization-step-size information, but also the block distortion can be effectively reduced. This is done by increasing the coring level for pixels near the borders of the unit blocks according to the position of the currently processed pixel.

Figure 7:
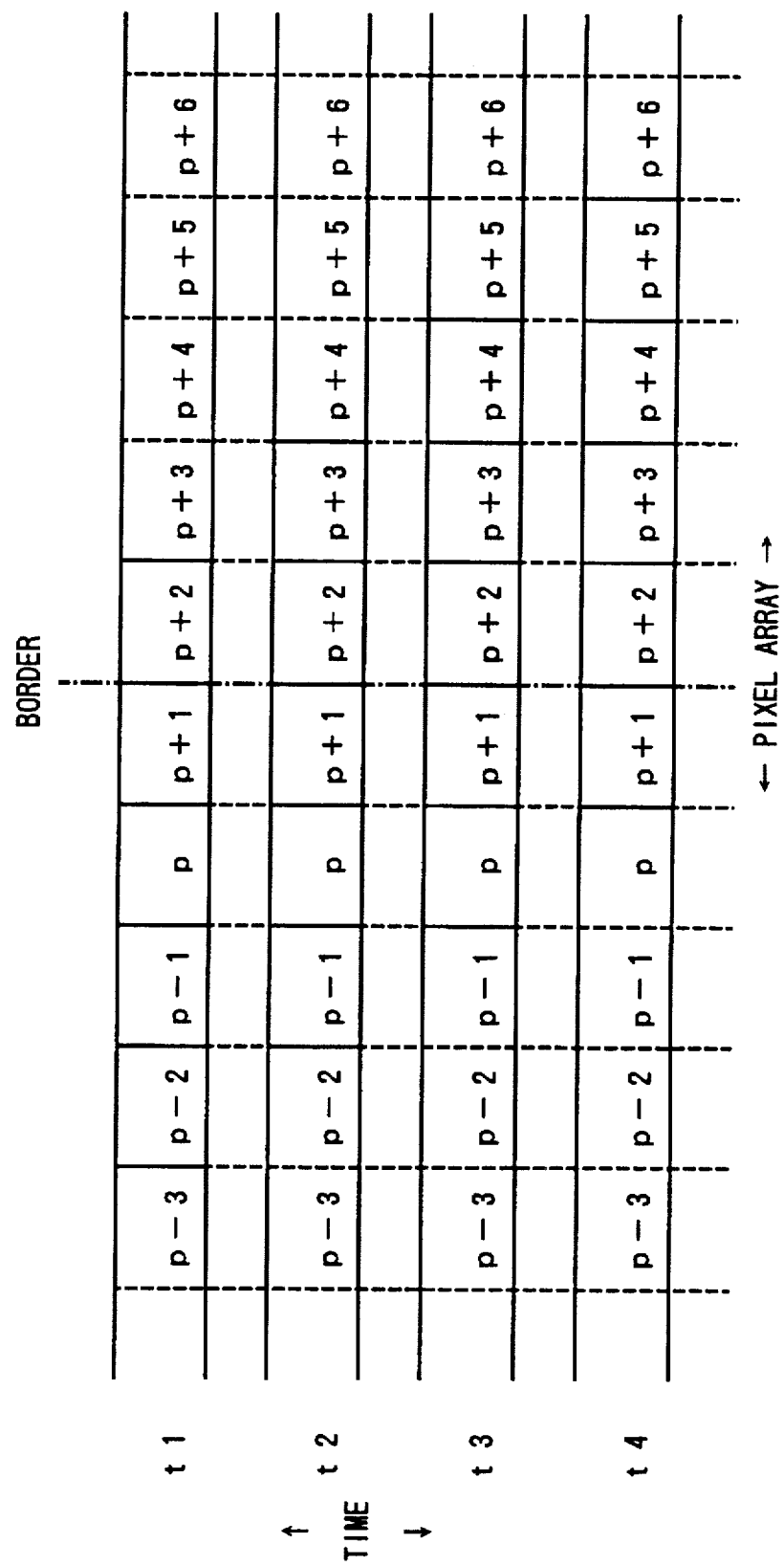
FIG. 7 is an illustrative drawing for explaining a process of determining a coring level for a pixel array at a control-signal generating unit of FIG. 6.

FIG. 7 is an illustrative drawing for explaining a process of determining the coring level for a pixel array at the control-signal generating unit 17. Here, the control-signal generating unit 17 generates the coring-level-control signal for effectively reducing the block distortion by setting the coring level at a large level for pixels near the borders of the unit blocks. In FIG. 7, t1, t2, t3, and t4 represent different points of time, each of which is delayed by one clock interval. In a given one-line pixel array of the image, predetermined coring levels are set for pixels p−3 through p+6 located near a border of the unit blocks.

As described above, in the third embodiment of the present invention, the control-signal generating unit 17 is provided with the block-quantization-step-size information from the quantization-information detecting unit 5 and with the position (address) of a currently processed pixel from the image memory 14. Then, the ROM table of the control-signal generating unit 17 outputs a coring-level-coefficient signal (coring-level-control signal) corresponding to a coring-level coefficient according to the address provided thereto (the block-quantization-step-size information and the position of the currently processed pixel). Thus, the frequency-response-characteristic modifying unit 7 can increase the coring level for pixels located near the borders of the unit blocks so as to effectively reduce the block distortions as well as the mosquito noise.

Figure 8:
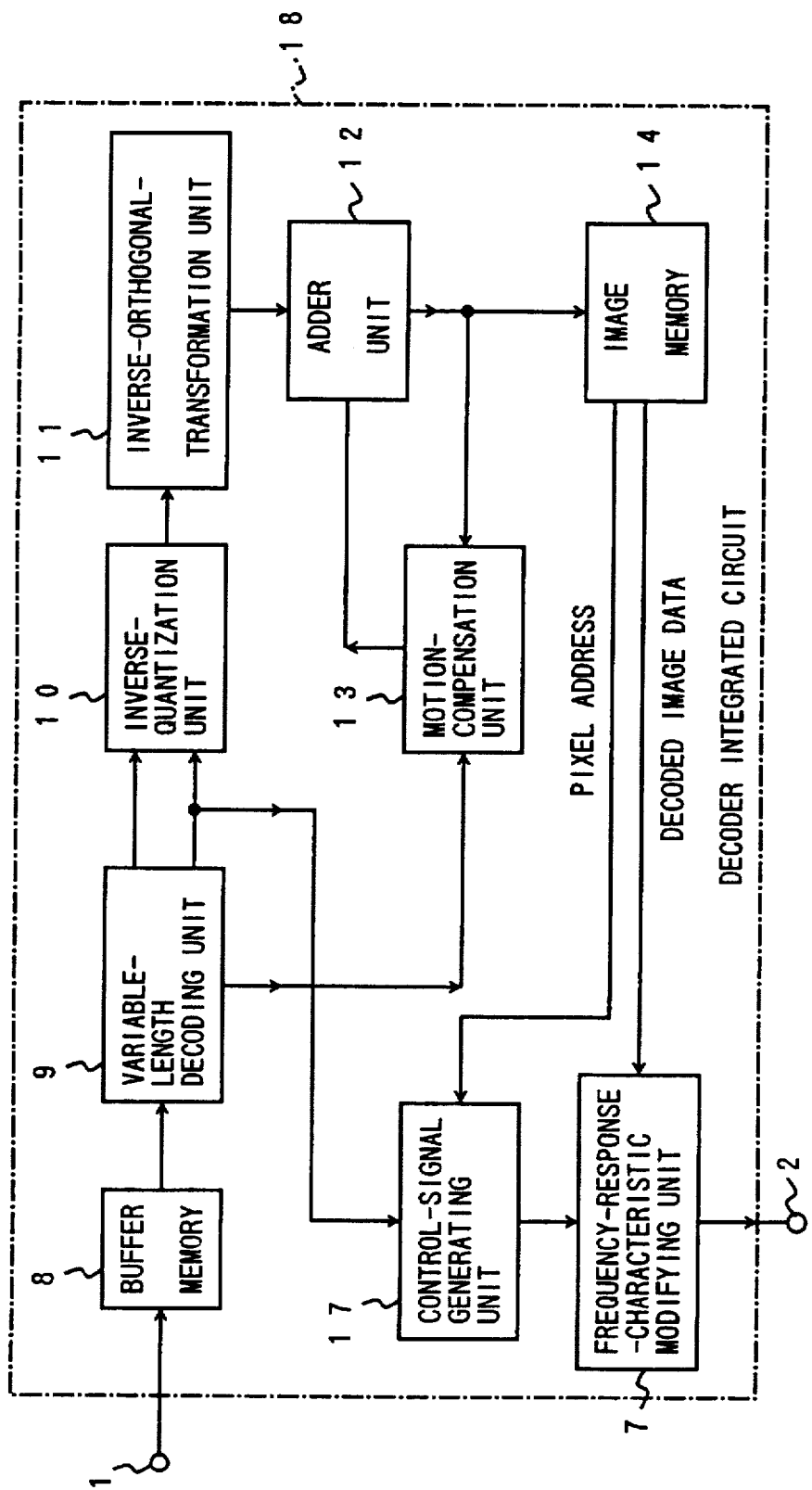
FIG. 8 is a block diagram of an image-data decoding device according to a fourth embodiment of the present invention.

FIG. 8 is a block diagram of an image-data decoding device according to a fourth embodiment of the present invention. In FIG. 8, the same elements as those of FIG. 6 are referred by the same numerals, and a description thereof will be omitted.

The image-data decoding device of FIG. 8 equipped with the adaptive coring device differs from the image-data decoding device of FIG. 6 in the following points. The block-quantization-step-size information (e.g., the quantization scale of a macro block QS) provided to the control-signal generating unit 17 is detected from the bit stream by the variable-length decoding unit 9. Also, the control-signal generating unit 17 and the frequency-response-characteristic modifying unit 7 are provided in a decoder integrated circuit enclosed in a dashed line 18.

As can be seen in the description provided above, according to the first through fourth embodiments of the present invention, the coring level used in the coring process is changeable according to the block-quantization-step-size information such that the coring level is increased for an image area using large block-quantization step sizes. Thus, the mosquito noise is readily reduced while the edges of the image are maintained. Also, the fact that a large magnitude mosquito noise appears in compressed-image areas using coarse quantization steps and a small magnitude mosquito noise appears in areas using fine quantization steps can be utilized. That is, the frequency-response-characteristic modifying unit 7 employing the adaptive coring process increases the coring level in areas of large block-quantization step sizes in accordance with the coring-level control signal provided from the control-signal generating unit, so that necessary fine features of a picture are not lost by the removal of the mosquito noise. Furthermore, the coring level can be increased for pixels near the borders of the unit blocks, so that the block distortion is effectively reduced along with the mosquito noise.

Figure 9:
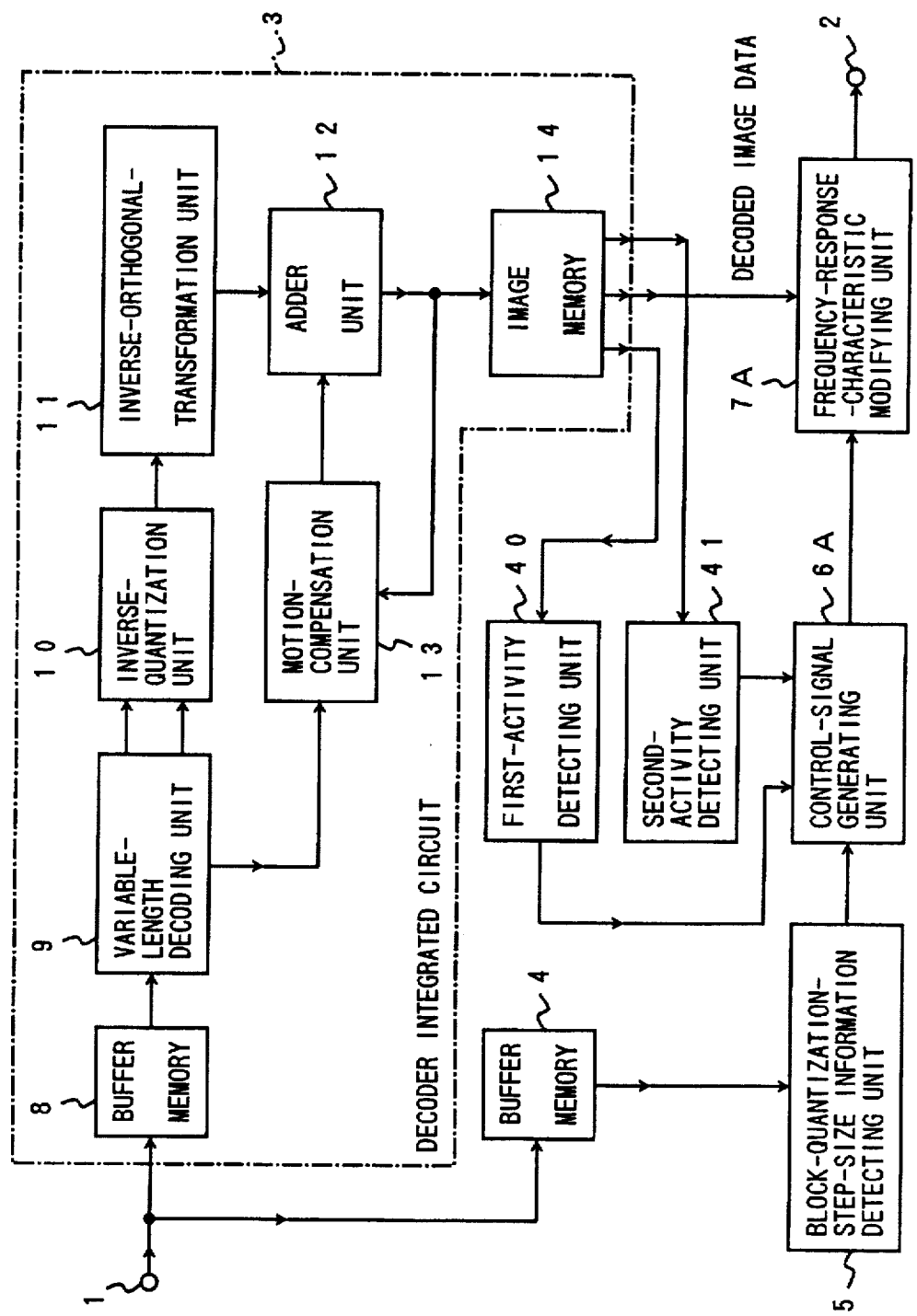
FIG. 9 is a block diagram of an image-data decoding device according to a fifth embodiment of the present invention.

FIG. 9 is a block diagram of an image-data decoding device according to a fifth embodiment of the present invention. In FIG. 9, the same elements as those of FIG. 1 are referred to by the same numerals, and a description thereof will be omitted.

The image-data decoding device of FIG. 9 differs from that of FIG. 1 in that a first-activity detecting unit 40 and a second-activity detecting unit 41 are provided to obtain activity values (indicators of image complexity) of the image data stored in the image memory 14. The activity values obtained by the first-activity detecting unit 40 and the second-activity detecting unit 41 are supplied to a control-signal generating unit 6A. The control-signal generating unit 6A generates a control signal based on the activity values, and provides it to a frequency-response-characteristic modifying unit 7A.

Figure 10:
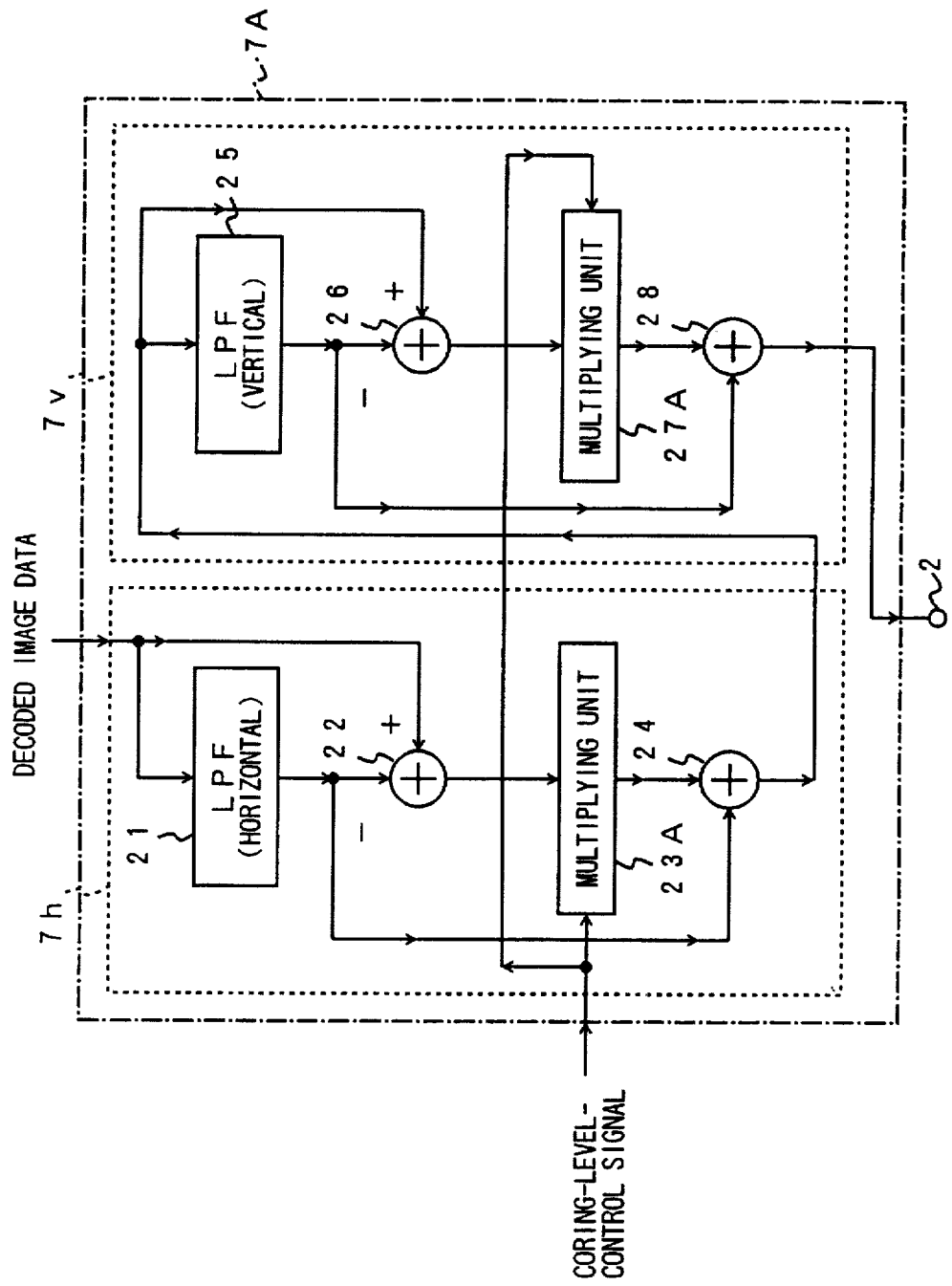
FIG. 10 is a block diagram of a frequency-response-characteristic modifying unit of FIG. 9.
Figure 11:
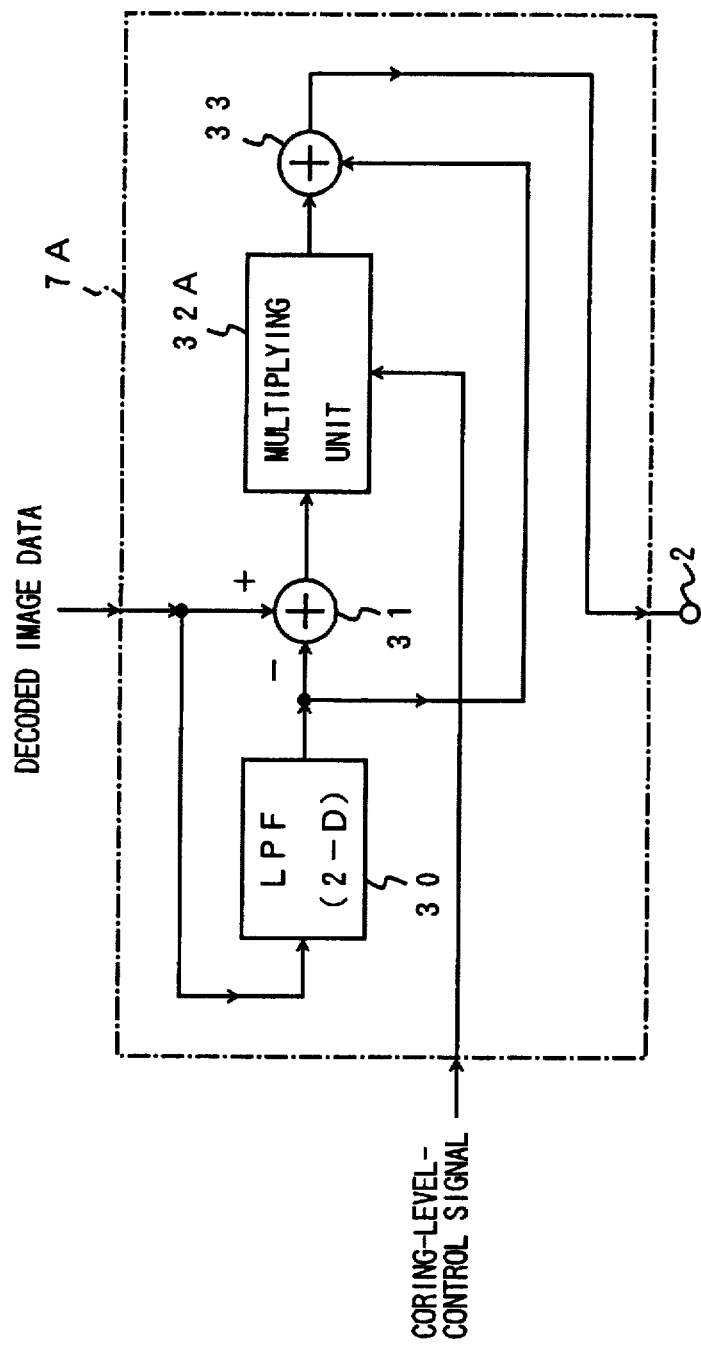
FIG. 11 is a block diagram of another configuration of the frequency-response-characteristic modifying unit of FIG. 9.

FIG. 10 is a block diagram of the frequency-response-characteristic modifying unit 7A, and FIG. 11 is a block diagram of another configuration of the frequency-response-characteristic modifying unit 7A. The configurations of FIG. 10 and FIG. 11 used in the fifth embodiment differs from those of FIG. 2 and FIG. 3 used in the first through fourth embodiments only in a control operation of the multiplying units. That is, the multiplying units of FIG. 2 and FIG. 3 multiply a magnitude of high frequency components by zero when that magnitude is less than the adaptive coring level. On the other hand, multiplying units 23A and 27A in FIG. 10 and a multiplying unit 32A of FIG. 11 multiply a magnitude of high frequency components by a control signal provided thereto.

The multiplying units 23A and 27A of FIG. 10 (or the multiplying unit 32A of FIG. 11) receive from the control-signal generating unit 6A the control signal, which is a multiplication-factor signal ranging from 0 to 1.25. In the output image data of the frequency-response-characteristic modifying unit 7A, signal components having higher frequencies than a predetermined cut-off frequency of the LPFs 21 and 25 (30) are multiplied by the multiplication factor ranging from 0 to 1.25.

When the control signal supplied from the control-signal generating unit 6A to the frequency-response-characteristic modifying unit 7A ranges from 0 to 1.0, the image data appearing at the output node 2 has signal components which are attenuated by a factor ranging 0 to 1.0 in frequencies higher than a predetermined cut-off frequency of the LPFS.

When the control signal supplied from the control-signal generating unit 6A to the frequency-response-characteristic modifying unit 7A ranges from 1.0 to 1.25, the image data appearing at the output node 2 has signal components which are intensified by a factor ranging 1.0 to 1.25 in frequencies higher than a predetermined cut-off frequency of the LPFs. Thus, contours in the image are enhanced.

The control signal supplied to the frequency-response-characteristic modifying unit 7A is generated by the control-signal generating unit 6A in the following manner. In FIG. 9, the control-signal generating unit 6A receives the block-quantization-step-size information (e.g., the quantization scale of a macro block QS) from the quantization-information detecting unit 5 and the activity values from the first-activity detecting unit 40 and the second-activity detecting unit 41. The first-activity detecting unit 40 detects a first activity value A1 for an area having a first size in the decoded image area. The second-activity detecting unit 41 detects a second activity value A2 for an area having a second size smaller than the first size in the decoded image area.

The first-activity detecting unit 40 and the second-activity detecting unit 41 have a function to detect an activity (indicator of image complexity) for a predetermined-size area in the image. The activity values of the image detected by the first-activity detecting unit 40 and the second-activity detecting unit 41 can be any one of various conventional indicators used as the activity values of an image.

Figure 12:
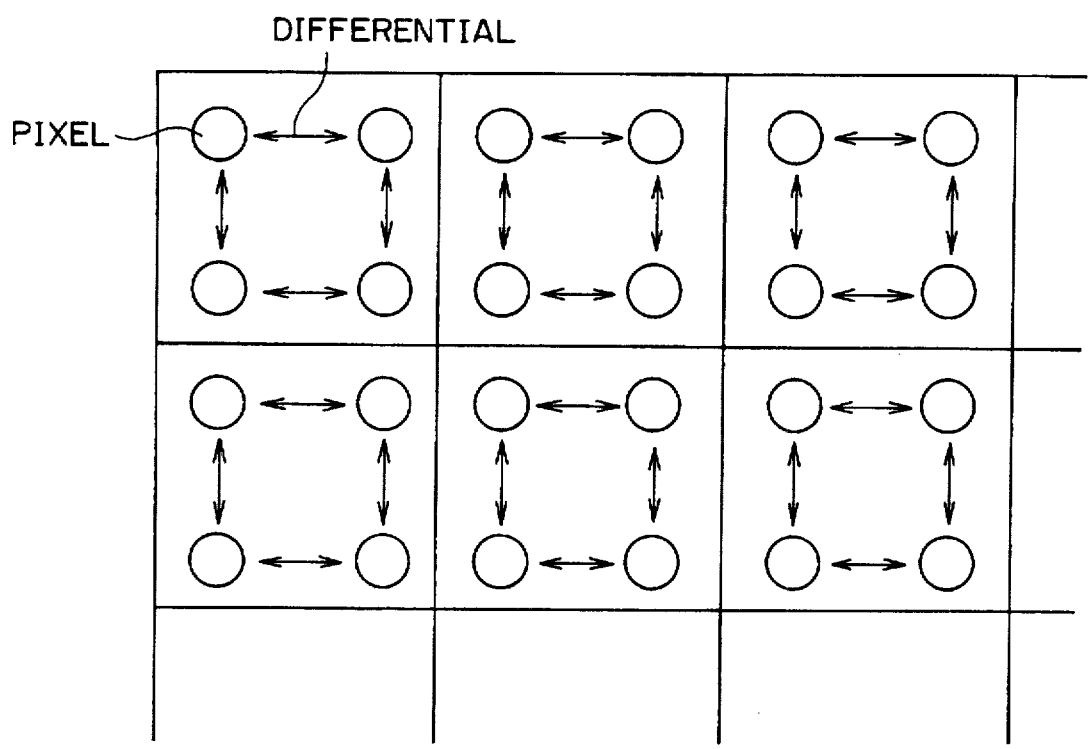
FIG. 12 is an illustrative drawing showing an example of a calculation of an activity value.

Namely, the first-activity detecting unit 40 and the second-activity detecting unit 41 may detect as the activity values a sum of differentials between adjoining pixels as shown in FIG. 12. Alternately, the first-activity detecting unit 40 and the second-activity detecting unit 41 may detect a variance obtained by calculating a square sum of differences between pixel values and an average pixel value within a block, a sum of absolute values of pixel values after an application of a predetermined filtering process, etc.

The area having the first size in the decoded image area for which the first-activity detecting unit 40 detects the first activity value A1 may be the unit block (DCT block). The area having the second size smaller than the first size in the decoded image area for which the second-activity detecting unit 41 detects the second activity value A2 may have a number of pixels corresponding to a filter length of a FIR filter used in the frequency-response-characteristic modifying unit 7A. For example, if the FIR filter is a one-dimensional filter having 3 taps or 5 taps as a filter length, the area having the second size may have 3 pixels or 5 pixels, respectively. Also, if the FIR filter is a two-dimensional filter having 3 taps or 5 taps as a filter length, the area having the second size may have 3×3 pixels or 5×5 pixels, respectively.

Based on the quantization-block-step-size information (e.g., the quantization scale of a macro block QS) defined for each macro block, the first activity value A1, and the second activity value A2, the control-signal generating unit 6A calculates a value G as:

$$G=\{K1-(QS\times(A1/A2)+1)\}/K2 \qquad (1)$$

wherein K1 and K2 are constant. Then, the control-signal generating unit 6A uses the value G as an address of a ROM table, for example, to generate the multiplication-factor signal ranging from 0 to 1.25.

Figure 13:
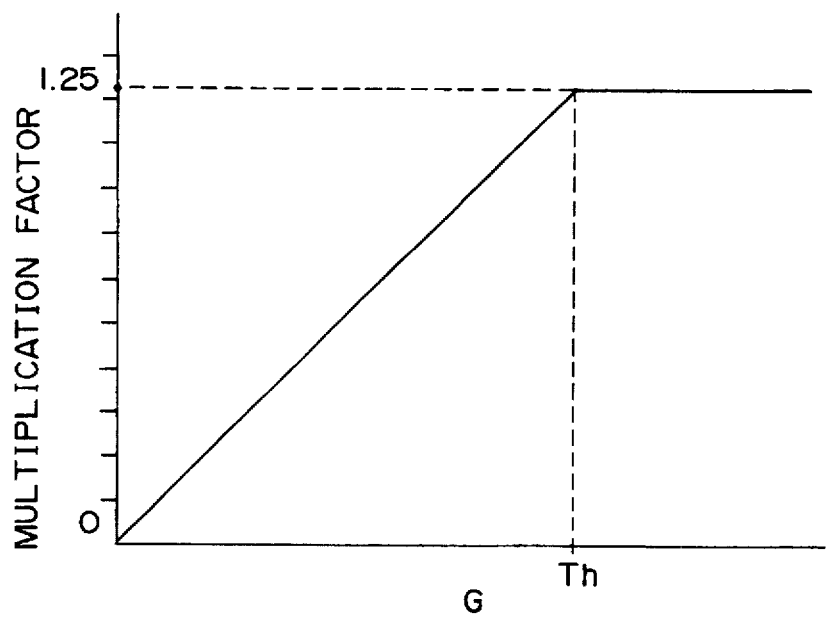
FIG. 13 is a chart showing an example of a relation between a multiplication factor and a value G.

FIG. 13 is a chart showing an example of a relation between the multiplication factor and the value G. As shown in FIG. 13, the multiplication factor is saturated at an upper limit when the value G exceeds a predetermined value Th. In FIG. 13, the upper value is shown as having an example value of 1.25. However, the upper limit does not need to be fixed at 1.25. As noted before, the multiplication-factor signal is supplied to the multiplying units 23A and 27A (32A) of the frequency-response-characteristic modifying unit 7A.

In the equation (1), the value G decreases as the block-quantization-step-size information (e.g., the quantization scale of a macro block QS) defined for each macro block becomes large and/or (A1/A2) increases. Here, the block-quantization-step-size information increases as the image is more complex.

A value of (A1/A2) indicates whether the image data in the proximity of a given pixel has a similar degree of complexity to the image data surrounding that proximity. That is, the value of (A1/A2) indicates whether the given pixel is that of a flat portion of an image or that of an edge portion of the image.

For example, the value of (A1/A2) becomes small at an edge portion so that the value G becomes large. On the contrary, a flat portion of an image has a large value of (A1/A2) so that the value G becomes small.

In the following, an operation of the frequency-response-characteristic modifying unit 7A and an outcome of the operation will be examined in order to facilitate the understanding of the fifth embodiment.

When the control signal supplied to the multiplying units 23A and 27A (32A) of the frequency-response-characteristic modifying unit 7A corresponds to a multiplication factor equal to 0, the image data appearing at the output node 2 from the frequency-response-characteristic modifying unit 7A only has frequency components corresponding to the frequency bands of the LPFs 21 and 25 (30). That is, the image data has no signal components which have higher frequencies than the predetermined cut-off frequency of the LPFs 21 and 25 (30).

When the control signal supplied to the multiplying units 23A and 27A (32A) of the frequency-response-characteristic modifying unit 7A corresponds to a multiplication factor equal to 0.5, the image data appearing at the output node 2 from the frequency-response-characteristic modifying unit 7A has frequency components corresponding to the frequency bands of the LPFs 21 and 25 (30). In addition, the image data has signal components having half the magnitude of original signal components which have higher frequencies than the predetermined cut-off frequency of the LPFs 21 and 25 (30).

When the control signal supplied to the multiplying units 23A and 27A (32A) of the frequency-response-characteristic modifying unit 7A corresponds to a multiplication factor equal to 1.0, the image data appearing at the output node 2 from the frequency-response-characteristic modifying unit 7A is the same as the image data supplied to the frequency-response-characteristic modifying unit 7A.

When the control signal supplied to the multiplying units 23A and 27A (32A) of the frequency-response-characteristic modifying unit 7A corresponds to a multiplication factor equal to 1.25, the image data appearing at the output node 2 from the frequency-response-characteristic modifying unit 7A has frequency components corresponding to the frequency bands of the LPFs 21 and 25 (30). In addition, the image data has signal components intensified 1.25 times as much as the original signal components which have higher frequencies than the predetermined cut-off frequency of the LPFs 21 and 25 (30). Thus, the resulting image has enhanced edges.

Figure 14:
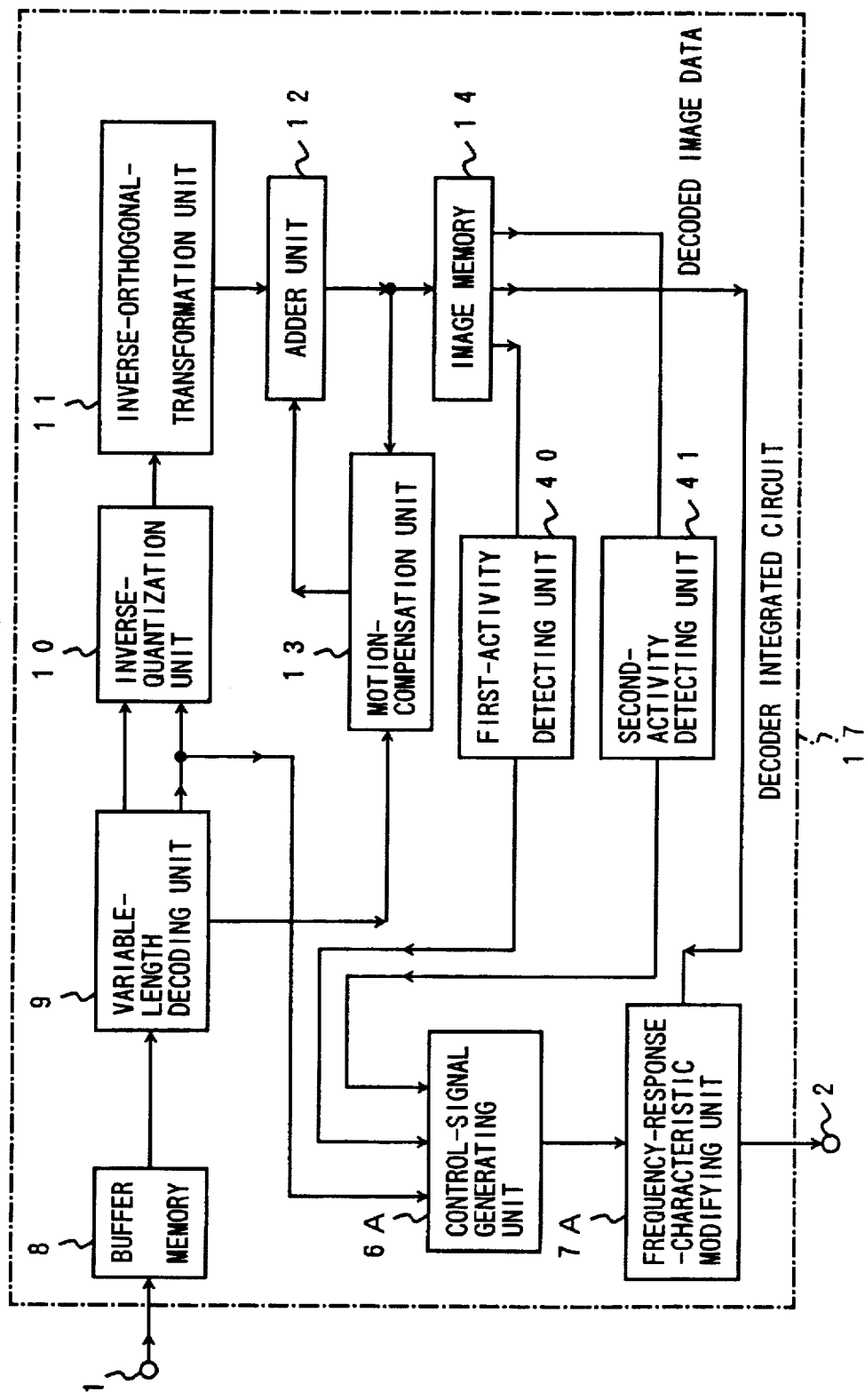
FIG. 14 is a block diagram of an image-data decoding device according to a sixth embodiment of the present invention.

FIG. 14 is a block diagram of an image-data decoding device according to a sixth embodiment of the present invention. In FIG. 14, the same elements as those of FIG. 9 are referred to by the same numerals, and a description thereof will be omitted.

In the image-data decoding device of FIG. 14, all units are provided in a decoder integrated circuit enclosed by the dashed line 17. Also, block-quantization-step-size information which is detected from the bit stream for a series of the macro blocks by the variable-length decoding unit 9 is provided to the control-signal generating unit 6A.

Namely, in the image-data decoding device of FIG. 14, the operations of the buffer memory 4 and the quantization-information detecting unit 5 of FIG. 9 provided outside the decoder integrated circuit indicated by the dashed line 3 are carried out by the buffer memory 8 and the variable-length decoding unit 9 provided in the decoder integrated circuit enclosed in the dashed line 17. Also, in FIG. 14, the decoder integrated circuit enclosed in the dashed line 17 includes the control-signal generating unit 6A and the frequency-response-characteristic modifying unit 7A. Here, the control-signal generating unit 6A is provided with the block-quantization-step-size information (e.g., the quantization scale of a macro block QS) extracted from the bit stream for a series of the macro blocks by the variable-length decoding unit 9. Then, the frequency-response-characteristic modifying unit 7A modifies the high-frequency components of the image data provided from the image memory 14 based on the control signal supplied from the control-signal generating unit 6A.

As can be seen from the description provided above, according to the fifth and sixth embodiments of the present invention, the first-activity detecting unit receives the decoded image data from the image memory, detects the first activity value for the area having a first size in the decoded image, and provides the first activity value to the control-signal generating unit. Also, the second-activity detecting unit detects the second activity value for the area having a second size smaller than the first size, and provides the second activity value to the control-signal generating unit. Based on the first and second activity values and the block-quantization-step-size information, the control-signal generating unit generates the control signal which is used as the multiplication factor by the multiplying units of the frequency-response-characteristic modifying unit. The frequency-response-characteristic modifying unit attenuates signal components having high frequencies in an image area where the block-quantization step sizes are large and the activity value is small. On the contrary, the frequency-response-characteristic modifying unit intensifies signal components having high frequencies in an image area where the block-quantization step sizes are small and the activity value is large. Thus, the mosquito noise generated during the process of decoding the image data is effectively reduced, and the edge portions of the image are enhanced to improve the image quality.

Further, the present invention is not limited to these embodiments, but other variations and modifications may be made without departing from the scope of the present invention.

What is claimed is:

1. A device for decoding coded image data divided into a plurality of blocks so as to generate decoded image data by applying an inverse orthogonal transformation to each block of said plurality of blocks, said device comprising:

a quantization-information detecting unit detecting block-quantization-step-size information indicative of quantization step sizes used for a given block, and a frequency-characteristic modifying unit eliminating high frequency components of said decoded image data for said given block based on said blockquantization-step-size information, said high frequency components having frequencies higher than a predetermined frequency wherein said frequency-characteristic modifying unit eliminates said high frequency components of said decoded image data based on said block-quantization-step-size information.

2. The device as claimed in claim 1, further comprising a control-signal generating unit generating a control signal based on said block-quantization-step-size information, and wherein said frequency-characteristic modifying unit eliminates said high frequency components of said decoded image data for said given block based on said control signal.

3. The device as claimed in claim 2, wherein said frequency-characteristic modifying unit comprises:

low-frequency separating means for separating low frequency components of said decoded image data, said low frequency components having frequencies lower than said predetermined frequency;

high-frequency separating means for separating said high frequency components;

eliminating means for eliminating said high frequency components when a magnitude of said high frequency components is less than a value of said control signal; and combining means for combining said low frequency components and an output of said eliminating means.

4. The device as claimed in claim 1, wherein said quantization-information detecting unit comprises variable-length decoding means for decoding said coded image data through a variable-length decoding format and for generating said block-quantization-step-size information.

5. The device as claimed in claim 1, wherein said frequency-characteristic modifying unit comprises means for eliminating said high frequency components of said decoded image data based on said block-quantization-step-size information and an address of a currently processed pixel of said decoded image data.

6. The device as claimed in claim 5, further comprising a control-signal generating unit generating a control signal based on said block-quantization-step-size information and said address of said currently processed pixel, and wherein said frequency-characteristic modifying unit eliminates said high frequency components of said decoded image data for said given block based on said control signal.

7. The device as claimed in claim 6, wherein said frequency-characteristic modifying unit comprises:

low-frequency separating means for separating low frequency components of said decoded image data, said low frequency components having frequencies lower than said predetermined frequency;

high-frequency separating means for separating said high frequency components;

eliminating means for eliminating said high frequency components when a magnitude of said high frequency components is less than a value of said control signal; and combining means for combining said low frequency components and an output of said eliminating means.

8. The device as claimed in claim 5, wherein said quantization-information detecting unit comprises variable-length decoding means for decoding said coded image data through a variable-length decoding format and for generating said block-quantization-step-size information.

9. A device for decoding coded image data divided into a plurality of blocks so as to generate decoded image data by applying an inverse orthogonal transformation to each block of said plurality of blocks, said device comprising:

a quantization-information detecting unit detecting block-quantization-step-size information indicative of quantization step sizes used for a given block;

a frequency-characteristic modifying unit modifying high frequency components of said decoded image data for said given block based on said block-quantization-step-size information, said high frequency components having frequencies higher than a predetermined frequency;

first-activity detecting unit detecting a first activity for a first image area having a first size in said decoded image data, said first activity being a measure of image complexity in said first image area; and second-activity detecting unit detecting a second activity for a second image area having a second size smaller than said first size in said decoded image data, said second activity being a measure of image complexity in said second image area, wherein said frequency-characteristic modifying unit modifies said high frequency components of said decoded image data based on said block-quantization-step-size information, said first activity, and said second activity.

10. The device as claimed in claim 9, further comprising a control-signal generating unit generating a control signal based on said block-quantization-step-size information, said first activity, and said second activity, and wherein said frequency-characteristic modifying unit operates according to said control signal to attenuate said high frequency components in some image areas, and to intensify said high frequency components in other image areas.

11. The device as claimed in claim 10, wherein said frequency-characteristic modifying unit comprises:

low-frequency separating means for separating low frequency components of said decoded image data, said low frequency components having frequencies lower than said predetermined frequency;

high-frequency separating means for separating said high frequency components;

gain converting means for converting a magnitude of said high frequency components based on said control signal; and combining means for combining said low frequency components and an output of said converting means.

12. The device as claimed in claim 9, wherein said quantization-information detecting unit comprises variable-length decoding means for decoding said coded image data through a variable-length decoding format and for generating said block-quantization-step-size information.

13. A method of decoding coded image data divided into a plurality of blocks so as to generate decoded image data by applying an inverse orthogonal transformation to each block of said plurality of blocks, said method comprising the steps of:

a) detecting block-quantization-step-size information indicative of quantization step sizes for a given block; and b) eliminating high frequency components of said decoded image data for said given block based on said block-quantization-step-size information, said high frequency components having frequencies higher than a predetermined frequency wherein said step b) eliminates said high frequency components of said decoded image data based on said block-quantization-step-size information.

14. The method as claimed in claim 13, wherein said step b) further comprises:

b1) generating a control signal based on said block-quantization-step-size information; and b2) eliminating said high frequency components of said decoded image data for said given block based on said control signal.

15. The method as claimed in claim 14, wherein said step b2) comprises the steps of:

b2-1) separating low frequency components of said decoded image data, said low frequency components having frequencies lower than said predetermined frequency;

b2-2) separating said high frequency components;

b2-3) eliminating said high frequency components when a magnitude of said high frequency components is less than a value of said control signal; and b2-4) combining said low frequency components and an output of said step b2-3).

16. The method as claimed in claim 13, wherein said step a) comprises a step of decoding said coded image data through a variable-length decoding format and generating said block-quantization-step-size information.

17. The method as claimed in claim 13, wherein said step b) eliminates said high frequency components of said decoded image data based on said block-quantization-step-size information and an address of a currently processed pixel of said decoded image data.

18. The method as claimed in claim 17, wherein said step b) further comprises the steps of:

b1) generating a control signal based on said block-quantization-step-size information and said address of said currently processed pixel, and b2) eliminating said high frequency components of said decoded image data for said given block based on said control signal.

19. The method as claimed in claim 18, wherein said step b2) comprises steps of:

b2-1) separating low frequency components of said decoded image data, said low frequency components having frequencies lower than said predetermined frequency;

b2-2) separating said high frequency components;

b2-3) eliminating said high frequency components when a magnitude of said high frequency components is less than a value of said control signal; and b2-4) combining said low frequency components and an output of said step b2-3).

20. The method as claimed in claim 17, wherein said step a) comprises a step of decoding said coded image data through a variable-length decoding format and generating said block-quantization-step-size information.

21. A method of decoding coded image data divided into a plurality of blocks so as to generate decoded image data by applying an inverse orthogonal transformation to each block of said plurality of blocks, said method comprising the steps of:

a) detecting block-quantization-step-size information indicative of quantization step sizes for a given block;

b) modifying high frequency components of said decoded image data for said given block based on said block-quantization-step-size information, said high frequency components having frequencies higher than a predetermined frequency;

c) detecting a first activity for a first image area having a first size in said decoded image data, said first activity being a measure of image complexity in said first image area; and d) detecting a second activity for a second image area having a second size smaller than said first size in said decoded image data, said second activity being a measure of image complexity in said second image area, wherein said step b) modifies said high frequency components of said decoded image data based on said block-quantization-step-size information, said first activity, and said second activity.

22. The method as claimed in claim 21, further comprising a step of e) generating a control signal based on said block-quantization-step-size information, said first activity, and said second activity, and wherein said step b) attenuates said high frequency components in some image areas and intensifies said high frequency components in other image areas according to said control signal.

23. The method as claimed in claim 22, wherein said step b) comprises the steps of:

b1) separating low frequency components of said decoded image data, said low frequency components having frequencies lower than said predetermined frequency;

b2) separating said high frequency components;

b3) converting a magnitude of said high frequency components based on said control signal; and b4) combining said low frequency components and an output of said step b3).

24. The method as claimed in claim 21, wherein said step a) comprises a step of decoding said coded image data through a variable-length decoding scheme and generating said block-quantization-step-size information.

* * * * *

UNITED STATES PATENT AND TRADEMARK OFFICE
CERTIFICATE OF CORRECTION

PATENT NO. : 5,754,699
DATED : MAY 19, 1998
INVENTOR(S) : SUGAHARA

It is certified that error appears in the above-identified patent and that said Letters Patent is hereby corrected as shown below:

TITLE PAGE, LEFT COLUMN, INSERT THE FOLLOWING; --[30] FOREIGN APPLICATION PRIORITY DATA
NOVEMBER 24, 1994 [JP] JAPAN ---6-314162
JANUARY 26, 1995 [JP] JAPAN ---7-030144

Signed and Sealed this

Twenty-third Day of February, 1999

Attest:

Q. TODD DICKINSON

*Attesting Officer*   *Acting Commissioner of Patents and Trademarks*